Dec. 11, 1928.  
H. DEDISSE  
1,695,247  
MUDGUARD FOR MOTOR VEHICLES  
Filed Nov. 10, 1926  3 Sheets-Sheet 1

INVENTOR  
HENRI DEDISSE  
BY  
ATTORNEYS

Dec. 11, 1928. 1,695,247
H. DEDISSE
MUDGUARD FOR MOTOR VEHICLES
Filed Nov. 10, 1926 3 Sheets-Sheet 2

INVENTOR
HENRI DEDISSE
BY *Munn & Co.*
ATTORNEYS

Dec. 11, 1928.
H. DEDISSE
1,695,247
MUDGUARD FOR MOTOR VEHICLES
Filed Nov. 10, 1926     3 Sheets-Sheet 3
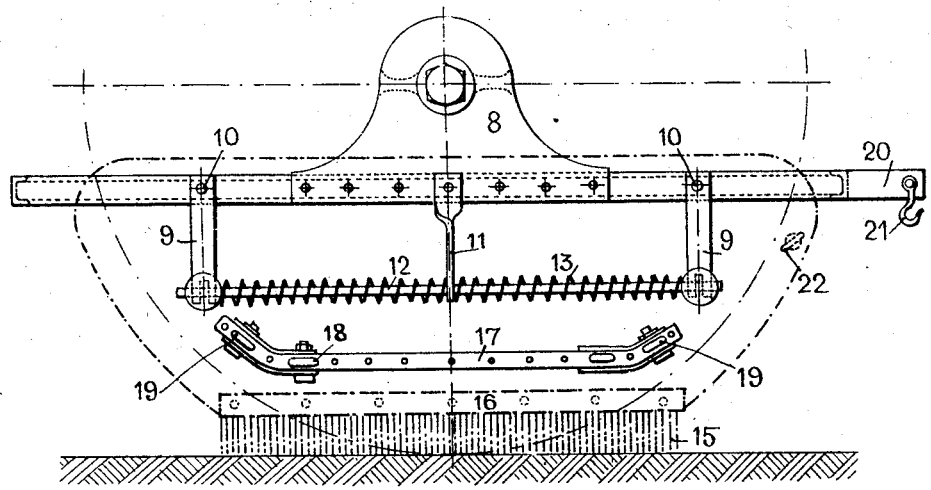
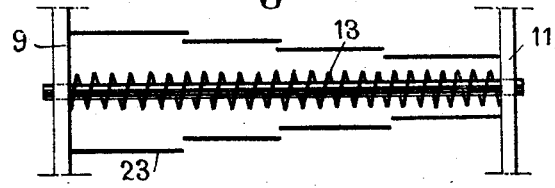
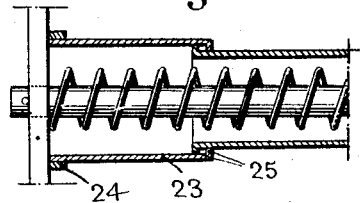
Inventor
Henri Dedisse
By Munn & Co.
Attorneys

Patented Dec. 11, 1928.

1,695,247

UNITED STATES PATENT OFFICE.

HENRI DÉDISSE, OF BOULOGNE-SUR-SEINE, FRANCE.

MUDGUARD FOR MOTOR VEHICLES.

Application filed November 10, 1926, Serial No. 147,500, and in France June 8, 1926.

The present invention relates to a mudguard for automobile or other vehicles, which is characterized by a screen consisting of a rigid portion maintaining at its lower part a flexible member which is pivotally mounted at the respective ends of rigid oscillating arms pivoted at the other ends to a rigid support which is mounted on the corresponding vehicle axle, the lower ends of the said oscillating arms being connected together by a rod which is guided in a slot formed in a rigid intermediate vertical arm which is in contact with springs whose outer ends abut against the respective ends of the said oscillating arms, thus tending to constantly maintain the mudguard in the normal position and to bring it into this position should it depart therefrom.

The invention is represented in the appended drawings.

Fig. 5 is a general elevational view,

Figs. 6 and 7 show respectively a diagrammatic construction and a partial section of a spring coacting with its guiding rod.

Figure 2:
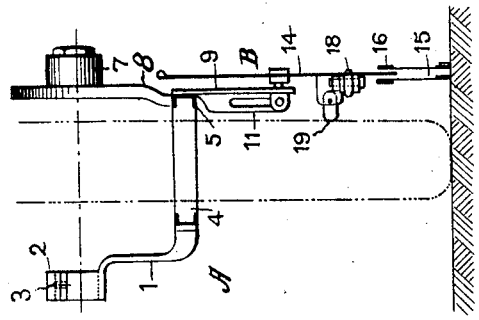
Figs. 1 to 3 show an apparatus employed for the front and rear wheels.

The apparatus comprises a stationary device A and a movable device B.

The stationary device comprises a support 1 which is secured to the vehicle axle by the cap 2 by means of the bolts 3, and which supports the U iron member 4—5 which is of a rigid character and surrounds the wheel, said member being made in two pieces which are connected together by the butt-plate 6 by means of bolts, so that the parts can be readily assembled and dismounted. At the exterior of the wheel, the cap 7 is substituted for the usual cap which is mounted upon the journal, and the said cap supports a pressed member 8 which serves to support the said U iron member at the exterior in a substantial manner.

Upon the said U iron member are disposed the two oscillating supports 9 which are pivotally mounted upon the bolts 10, and a stationary guiding support 11; these three supports serve to maintain the rod 12 and the reaction springs 13.

The movable device B forms a screen and prevents the mud from being thrown to the exterior; it consists of a sheet metal screen 14 having mounted at the lower part the two brushes 15 which are secured to the screen by the flat bars 16 bolted to the said screen.

Figure 1:
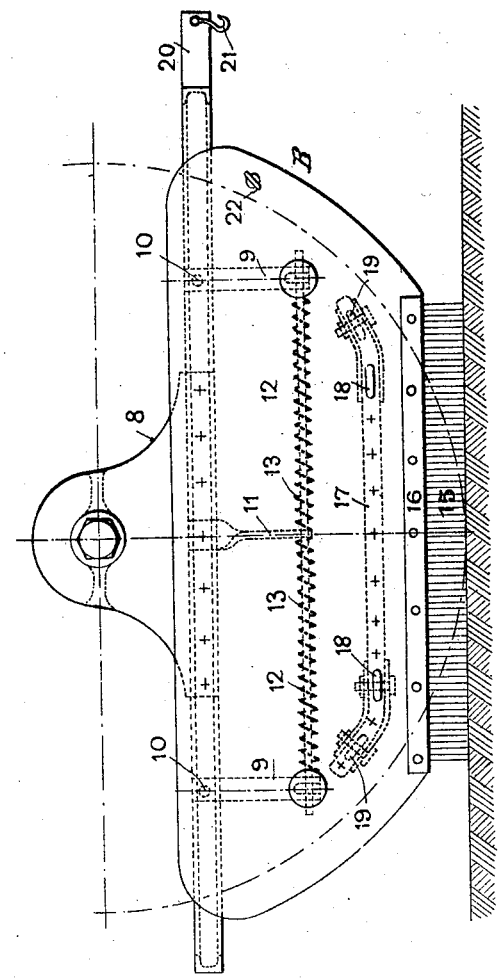
Figure 3:
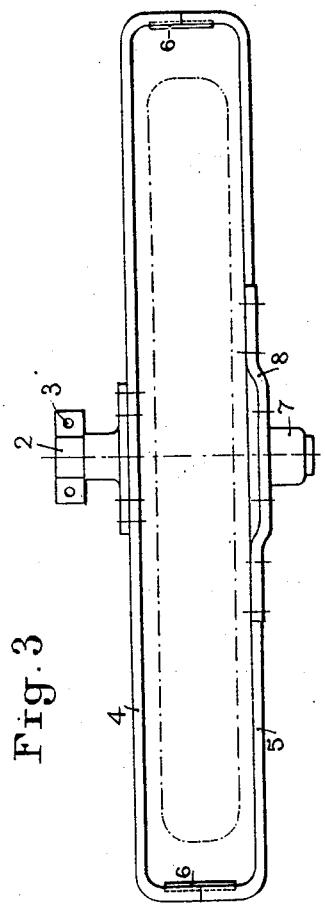

A support 17 which is riveted to the screen serves to maintain the rollers 18 which are adapted to roll upon the edge of the pavement, as well as the rollers 19 which are adapted to roll upon the india rubber tyre of the wheel, thus preventing the deformation of the screen and also obviating all wear of the edge of the pavement or the india rubber by an excessive friction when the vehicle takes its position alongside the pavement. The whole apparatus is shown in Figs. 1, 2 and 3.

Figure 4:
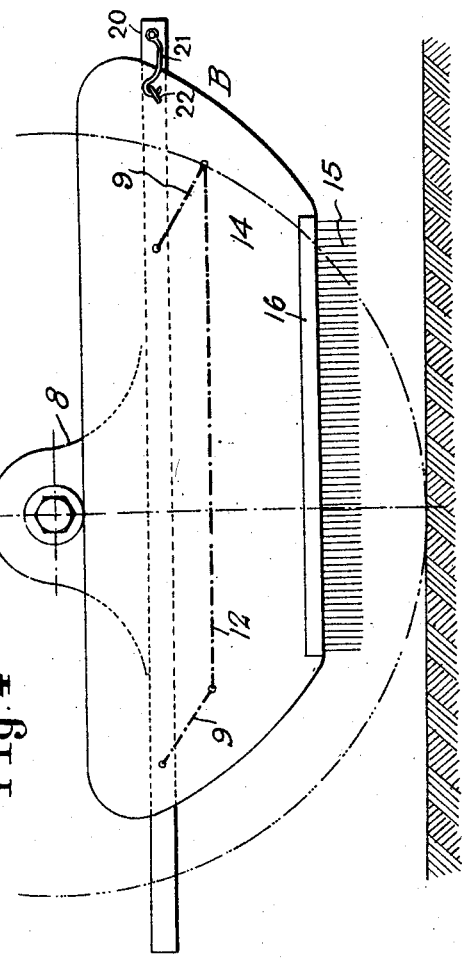
Fig. 4 shows the apparatus in the raised position.

Fig. 4 shows the device in the raised position. This device consists of a support 20 which is mounted at the end of a rigid frame 5 and maintains the hook 21 which holds the said screen in the raised position when the hook is inserted into the ring 22 mounted on the screen.

As shown in Figs. 5 to 7, each spring 13 which is interposed between the stationary middle support 11 and the pivoted end supports 9 is protected by a suitable jointed casing which preferably consists as shown in Figs. 6 and 7 of a telescoping tube 23 which is maintained upon the supports 9 and 11 by suitable connecting members 24 (Fig. 7) of any desired shape, the motion of the elements of the telescoping tube 23 being limited by the stops 25 of adequate construction.

The whole device is preferably made fluid-tight and the casing thus formed is filled with a suitable lubricant such as consistent grease which will maintain all the parts in a good operating condition and will effectively prevent access of all water or mud.

The telescoping tubes composed of the elements 23 may be replaced by a deformable casing of any suitable material, optionally flexible, which may consist for instance of india rubber, rubber coated cloth, or the like.

Further, I may in certain cases dispense with the rollers 18—19 which are adapted to roll respectively upon the edge of the pavement and the india rubber or other tire of the wheel, when the vehicle is brought alongside the pavement. This arrangement can be chiefly eliminated when the apparatus is employed with wheels provided with solid tires, but it might also be eliminated in the case of wheels provided with pneumatic tires.

What I claim is:

1. A mud-guard for automobile and other vehicles characterized by a screen consisting of a rigid portion maintaining at its lower end a flexible member, and pivotally mounted on the end of rigid oscillating arms 9 which are pivoted at the other ends to a rigid support 5 adapted to bear upon the corresponding vehicle axle, the lower ends of the pivoted arms being connected together by a rod 12 which is guided in a slot formed in an intermediate rigid vertical arm 11 upon which are caused to bear the springs 13 which abut at the other ends upon the respective extremities of the oscillating arms 9 which tend to maintain the mud-guard constantly in the normal position and will bring it into this position should it depart therefrom.

2. A construction form of the mud-guard as claimed in claim 1, characterized in that the rigid screen is apertured and carries on its inner face two sets of rollers 18—19 whereof one set 19 makes contact with the corresponding wheel and the other set 18 projects through the apertures of the screen and is adapted to enter into contact with the edge of the pavement in case the vehicle wheel should be pressed against the pavement, so as to obviate all deformation of the mud-guard.

3. A constructional form of mud-guard as claimed in claim 1, in which the springs serving to maintain the mud-guard screen in the middle position or to bring it into this position are disposed in a deformable protecting casing preferably filled with a lubricant such as consistent grease, in order to maintain all the parts in proper working order and to prevent the access of water or mud.

4. A constructional form of mud-guard as claimed in claim 1, in which the springs serving to maintain the mud-guard in the middle position or to bring it into this position and disposed in a telescoping protecting casing.

In testimony whereof I have hereunto set my hand.

HENRI DÉDISSE.